United States Patent

O'Dell

[11] Patent Number: 5,085,402
[45] Date of Patent: Feb. 4, 1992

[54] HIGH SPEED SOLENOID VALVE ACTUATOR

[75] Inventor: Gerald W. O'Dell, Old Lyme, Conn.

[73] Assignee: The Lee Company, Westbrook, Conn.

[21] Appl. No.: 565,510

[22] Filed: Aug. 10, 1990

[51] Int. Cl.$^5$ ............................................. F16K 31/06
[52] U.S. Cl. .......................... 251/129.21; 251/129.15; 251/129.16
[58] Field of Search ....................... 251/129.21, 129.15, 251/129.16

[56] References Cited

U.S. PATENT DOCUMENTS

| | | | |
|---|---|---|---|
| 3,368,788 | 2/1968 | Padula | 251/129.15 X |
| 3,651,833 | 3/1972 | Piko | 251/129.15 X |
| 4,538,129 | 8/1985 | Fisher | 251/129.21 X |
| 4,778,112 | 10/1988 | Deconcini et al. | 251/129.16 X |

*Primary Examiner*—Arnold Rosenthal
*Attorney, Agent, or Firm*—Philip J. Lee

[57] ABSTRACT

An actuator for an axial flow control valve for operation at high speeds comprises an axially symmetrical plunger armature prebiased against a valve seat in a normally closed position, the plunger having a head portion of increased diameter and a rod portion, the rod portion being slidably received within a central passage of a bobbin, and axially spaced from a pole piece. The valve actuator further comprises a cylindrical housing encasing in coil wound around the bobbin with a central passage configured to allow the flow of fluid around the armature and pole piece when the valve is open, the pole piece, armature housing and end piece being magnetically permeable and the magnetic circuit being completed by a similarly magnetically permeable washer fitted into the housing having an internal opening diameter greater than the diameter of the plunger rod section and less than the diameter of the plunger head section positioned on the bobbin side of the plunger head. Upon excitation of the coil a magnetic circuit is completed, comprising two air gaps, the first being the conventional air gap between the pole piece face and the opposing face of the plunger rod section end, and the second air gap being between the axially opposing surfaces of the washer and the plunger head whereby both air gaps act in an axial direction to produce a high ratio of axial force to mass of the plunger armature creating high speed operation.

20 Claims, 7 Drawing Sheets

HIGH SPEED SOLENOID VALVE ACTUATOR

BACKGROUND OF THE INVENTION

A. Field of Invention

The present invention relates generally to valve actuating devices and more particularly to a new and improved high speed solenoid valve actuator for an axial flow, fluid control valve.

B. Description of Related Art

A number of solenoid actuated fluid control valves currently exist commonly using the armature of a solenoid to act as a working component of the valve. According to the common structure of such actuators, the speed of operation of the valve is directly dependent upon the ratio of the axial force generated by excitation of the solenoid to the mass of the armature and/or any attachments thereto, everything else being equal. In a plunger type fluid control valve, the armature itself may comprise a plunger sliding within a portion of a solenoid bore around which a wire coil is wound, and a magnetic circuit is formed by the plunger, a pole piece, and the solenoid housing that extends from the pole piece, around the coil, and returns to the plunger. In such configuration, the axial force on the plunger is derived entirely from a first air gap between the opposing surfaces of the plunger and a solenoid pole piece wherein the lines of magnetic flux are generally parallel to the axis of the plunger. A second air gap also exists, consisting of the opposing surfaces of the housing and the plunger at the radial clearance at the opening where the plunger enters the solenoid bore. The second air gap therefore usually only exerts a radial force on the plunger and not an axial force. Thus the axial force to armature mass ratio does not increase as a result of the second air gap. Moreover, the second air gap decreases the speed of valve operation and increases the wear on the plunger by creating a frictional drag between the surfaces of the second air gap. Since the plunger is rarely, if ever, perfectly balanced and since the electromagnetic force across each air gap increases in inverse relation to the square of the air gap distance, there ia a tendency to close the air gap on one side only. When the plunger begins to tilt a very small amount, the radial gap proceeds to close at the nearest point, causing wear and tear on the contact points as well as friction drag slowing the speed of the armature.

An example of such a valve actuator device appears in U.S. Pat. No. 4826130 to Griffith which discloses the use of a polymeric film lubricant coating the parts that comprise the second radial magnetic air gap to reduce the detrimental effects of friction in that area. Another modification to increase the axial force is to enlarge the surface area of the axial air gap as is shown in U.S. Pat. No. 4658231 to Schwenzer. The Schwenzer actuator does not make any attempt to change the second air gap nor to reduce the mass of the armature, but merely seeks to ameliorate the negative effects of the radial orientation. Another adaptation designed to improve responsiveness is the polarized electro magnet disclosed in U.S. Pat. No. 4855,701 to Yokoyama similarly does not teach or attempt to axially align both air gaps. Still another modification of electromagnets appears as the stepped exterior armature of the electro magnetic device disclosed in U.S. Pat. No. 4553121 to Logie which provides multiple axial air gaps without attempting to axially align the radial air gaps of each coil, but rather achieving the results from a multiple coil configuration.

U.S. Pat. No. 4810,985 to Mesenich discloses a device which by utilizing a cup shaped external armature does align the second air gap in an axial direction. In particular, the valve shown as FIG. 5 in Mesenich appears to provide an solenoid axial flow valve wherein both air gaps are essentially axially oriented. The Mesenich valve is designed for fuel injection automobile usage and in order to provide axial flow without creating a radial air gap in the disclosed configuration, the coil is relatively short and large in diameter. The cup shaped armature extends from an annular central air gap, radially outward and around the coil exterior to a second annular air gap and with the attached valving apparatus comprises a significant mass. In addition, the armature has large surfaces that slide past opposing surfaces of both the stator and valve body, creating the likelihood of frictional drag, increasing wear and decreasing speed of operation. The cup shaped armature additionally displaces a large volume of fluid media upon actuation which would tend to slow the valve speed. The foregoing features of the Mesenich device appear to require opposing springs and a relatively large coil to maintain a high speed operation in a bulky design.

Particularly in the field of ink jet printing, it is frequently desirable to electrically control operation of multiple valve banks wherein radial compactness is a primary design priority as is speed of operation particularly the cycle from closed to open and back to closed position which determines the accuracy of the printing accomplished and is desirably in the 1600 Hertz range. Manufacturing economy is also an important consideration due to the number of individual valves utilized in each printing device. Since the diameter of such a valve is approximately $\frac{1}{4}$ of an inch, the relatively complicated and bulky valves and actuators identified above are either impossible or difficult and uneconomical to manufacture and operate. In particular, the cup shaped armature of Mesenich does not appear to have the potential for sufficient reduction in diameter to be useful in ink-jet printing applications.

Inclusion of the above-identified previously issued U.S. Patents is intended for illustration of other known valve actuator devices and is not intended as a representation that the identified patents constitute relevant prior art nor that all such devices or patents are included, nor that the devices would be suggested for use in the field of ink-jet printing.

SUMMARY OF THE INVENTION

The invention herein described comprises a solenoid valve actuator with plunger type armature originally designed for use in valve operations wherein a very high speed plunger action is required. The present invention was specifically designed for operation of an axial flow valve for use in ink-jet printing devices. The present invention comprises a wire coil wound on nonmagnetic bobbin surrounding a central axially extending bore. A rod-like plunger stop extends into the bore from one end of the bobbin and is affixed within the axial bore. At the other end of the bobbin a plunger is slidingly disposed within the bobbin bore and a spring biases the plunger away from the plunger stop, absent excitation of the coil. Both the plunger stop and plunger are made of magnetically permeable material and the plunger stop serves as a pole piece. A cylindrically shaped housing surrounds the valve and, in particular the coil. The plunger comprises two sections, a rod-like section that enters within the axial bobbin bore and a valve head section of enlarged radius. A magnetically permeable washer is positioned normal to the axis of the coil and plunger and extends radially inwardly from the housing to provide the opening through which the rod section of the plunger enters the bobbin bore. The washer opening has an inside diameter that is greater than the diameter of the plunger rod section but less than the diameter of the plunger valve head section, thereby causing a radial overlap of the opposing surfaces of the plunger valve head section and the washer. A plurality of slots are cut in the surface of the washer that contacts the plunger valve head section, thereby allowing flow through the overlap of the opposing surfaces. The plunger biasing spring is a non-magnetic, helical spring that surrounds the plunger rod section and is seated at one end by a shoulder formed by the bobbin and at the other end by a shoulder formed by the junction of the plunger valve head section with the rod section. The plunger biasing spring passes through the washer opening. The clearance between the inside edge of the washer opening and the radially outer surface of the plunger is substantially greater than the separation of the opposing surfaces of the plunger valve head section and the washer.

Upon the energization of the solenoid by the flow of current through the coil the magnetic flux is created according to the path shown in FIGS. 5 and 6. A first air gap is created between the plunger stop and the opposing end of the plunger rod section and a second air gap is created between the surface of the plunger valve head section and the opposing surface of the washer which serves as a second pole piece. The first air gap is similar to the air gap that provided the axial force that operates conventional solenoid actuated valves; however the second air gap is oriented to provide an axial force rather than a radial force as in conventional solenoid actuated valves.

An axial flow valve operated by the actuator of the present invention is capable of an operating cycle in the 1600 Hertz range which is useful in ink-jet printing devices. It is understood that at such speed the coil is not energized for a sufficient period of time for the entire plunger to be saturated with magnetic flux and due to the skin effect, flux is concentrated of the surface of the plunger and eddy current losses are thereby limited. Further, the coil itself can be configured with a relatively small inside diameter thereby decreasing the electrical resistance of the coil. In the illustrated preferred embodiment, the overall ratio of the length of a valve utilizing the actuator of the present invention, to the diameter thereof is about three to one, being about 0.800 of an inch long and 0.250 of an inch in diameter.

As illustrated in the Drawings, an axial flow path is provided by the radial clearance between both the plunger stop and the plunger rod section and the inside surface of the bobbin bore. Axially extending ridges protrude radially inward from the inside surface of the bobbin bore to secure the plunger stop and to guide the plunger rod section while allowing flow through the bobbin bore. The valve housing provides a radial clearance around the outside of the plunger valve head section. In the illustrated fluid control valve, the plunger valve head section presents a disk like surface which accepts an insert of suitable material for sealingly and releasably engaging the valve seat. The illustrated valve is normally closed and is designed for the valve seat end to be the outlet end of the valve and the other end of the valve is accordingly adapted with an inlet port. The inlet end of the bobbin is adapted to provide an inlet chamber communicating with the bobbin bore to provide a flow passage of relatively even capacity.

The purpose and object of the present invention is to increase the magnetic force of the solenoid on the plunger without proportionally increasing the mass of the plunger thereby increasing plunger speed. By aligning both air gaps to produce axial force without substantially increasing the mass of the plunger, the desired goal is achieved.

The principal aim of the present invention is to provide a new and improved solenoid valve actuator which meets the foregoing requirements and which is suitable for use in a fluid control valve capable of very high speed operation.

Another and further object and aim of the present invention is to provide a new and improved solenoid valve actuator which is suitable for use in a fluid control valve which will be economical to manufacture in miniature sizes.

Another and further object and aim of the present invention is to provide a new and improved solenoid valve actuator which is suitable for use in a fluid control valve capable of operation at 1600 Hertz.

Another and further object and aim of the present invention is to provide a new and improved solenoid valve actuator which is suitable for use in a fluid control valve durable and capable of sustained, reliable high speed operation.

Another and further object and aim of the present invention is to provide a new and improved solenoid valve actuator which is suitable for use in an axial flow fluid control valve of minimal diameter.

Other objects and advantages of the invention will become apparent from the Description of the Preferred Embodiment and the Drawings and will be in part pointed out in more detail hereinafter.

The invention consists in the features of construction, combination of elements and arrangement of parts exemplified in the construction hereinafter described and the scope of the invention will be indicated in the appended claims.

DESCRIPTION OF THE PREFERRED EMBODIMENTS(S)

Figure 1:
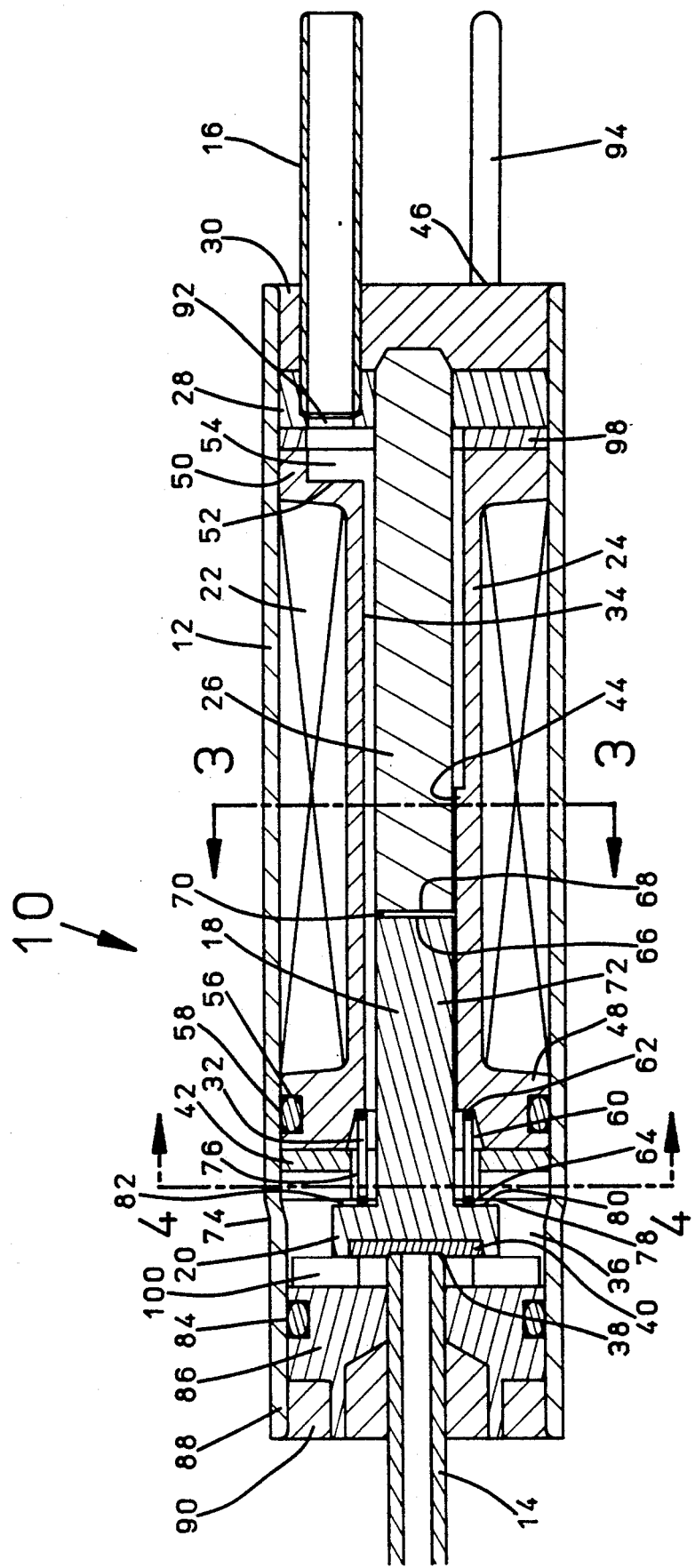
FIG. 1 is an enlarged, longitudinal section view of an axial flow control valve incorporating a preferred embodiment of a solenoid valve actuator constructed in accordance with the present invention, taken through the plane of line 1—1 as shown in FIGS. 3 and 4, showing the valve in a closed, non-activated position.
Figure 2:
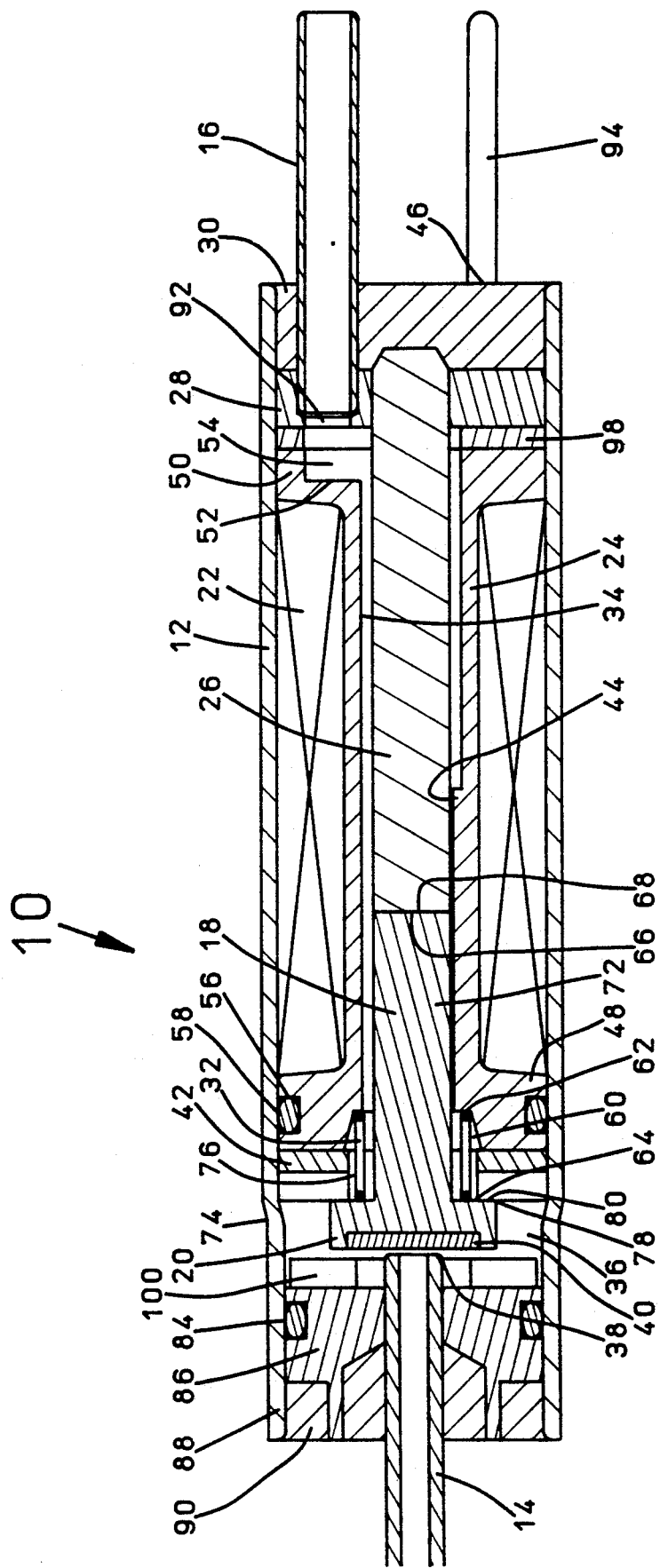
FIG. 2 is an enlarged, longitudinal section view of an axial flow control valve incorporating a preferred embodiment of a solenoid valve actuator constructed in accordance with the present invention, taken through the plane of line 1—1 as shown in FIGS. 3 and 4, showing the valve in an open, activated state.
Figure 3:
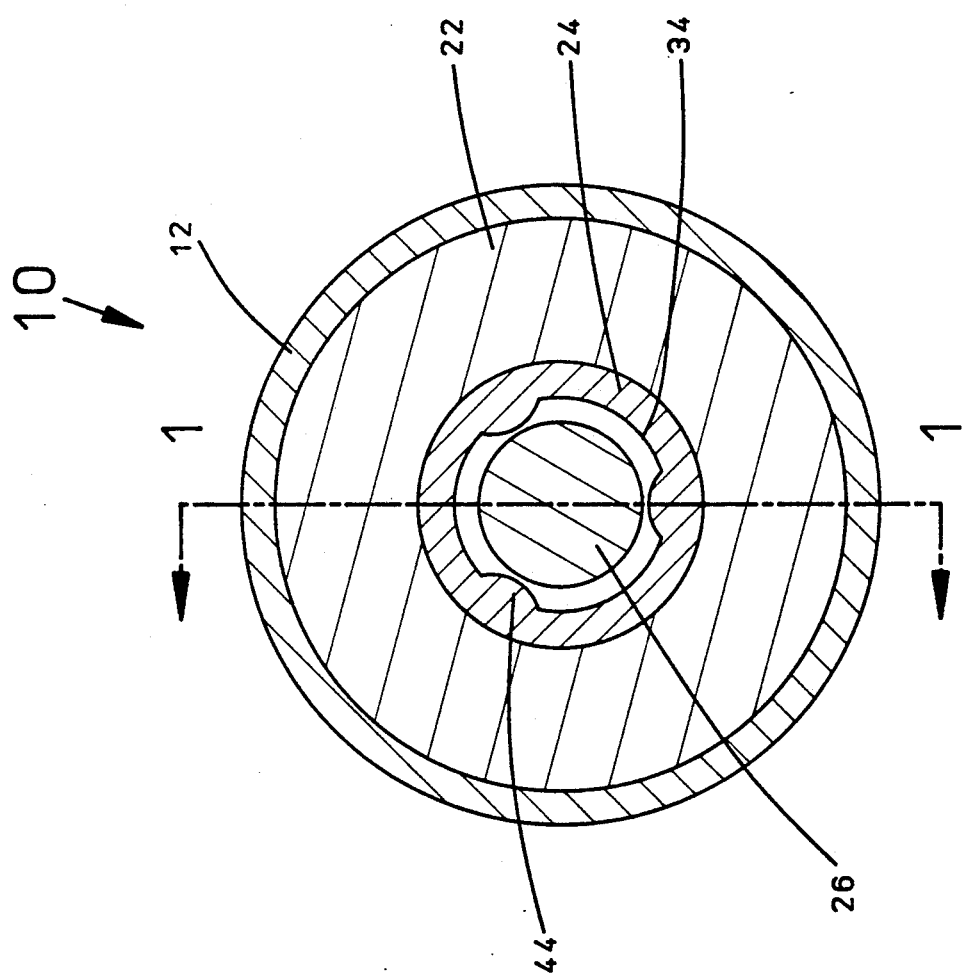
FIG. 3 is an enlarged, cross section view of an axial flow control valve incorporating a preferred embodiment of a solenoid valve actuator constructed in accordance with the present invention, taken along line 3—3 as shown in FIG. 1.
Figure 4:
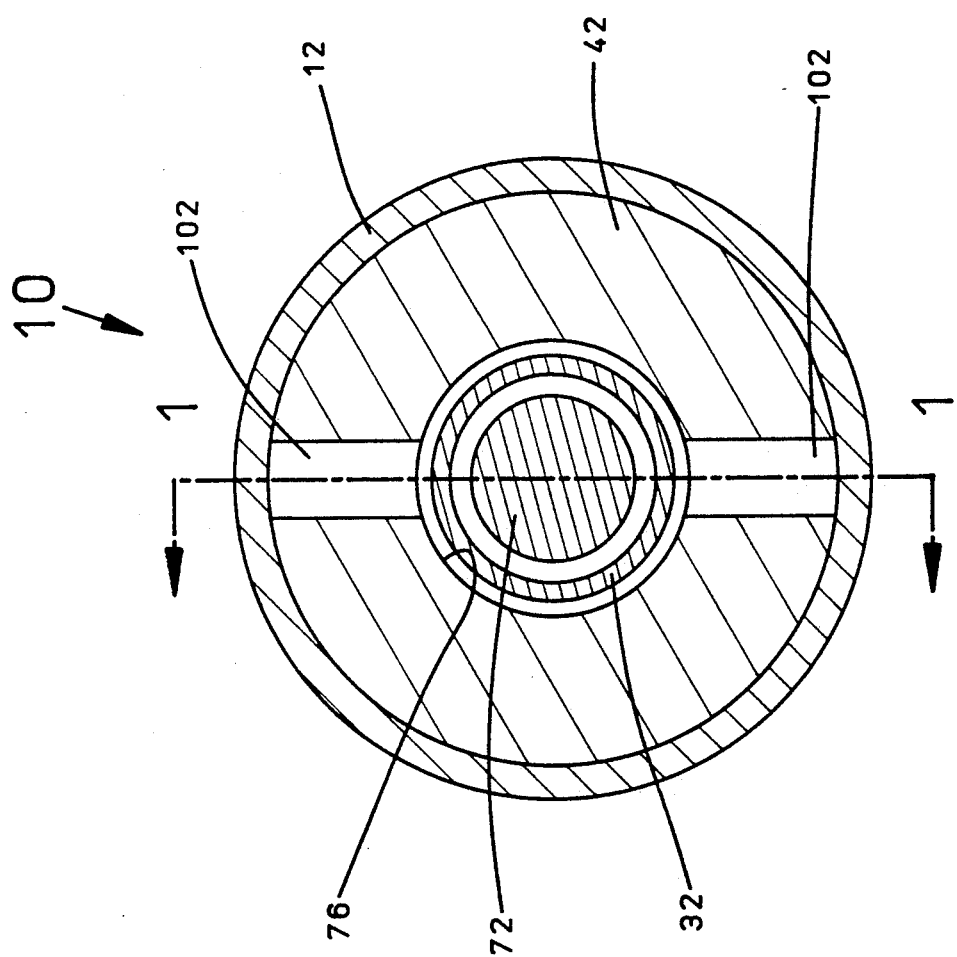
FIG. 4 is an enlarged, cross section view of an axial flow control valve incorporating a preferred embodiment of a solenoid valve actuator constructed in accordance with the present invention, taken along line 4—4 as shown in FIG. 1.

With reference to the drawings wherein like numerals represent like parts throughout the figures, an axial flow control valve incorporating a solenoid valve actuator in accordance with the present invention is generally designated by the numeral 10. Valve 10 is of a generally axial flow configuration having a generally cylindrical housing 12 and having an inlet port 16 at one end and an outlet port 14 at the other opposing end. A plunger 18 releasably engages and blocks a valve seat 38 thereby preventing flow through the valve 10. The valve seat 38 surrounds the outlet port 14 and a spring 32 biases plunger 18 against valve seat 38 such that the valve 10 is normally closed. Plunger 18 is retractable from valve seat 38 toward the inlet port 1 to allow flow through valve 10. The solenoid valve actuator apparatus of the present invention provides the retractile force required to overcome the closing force of spring 32 and thereby open valve 10. The solenoid valve actuator apparatus of the present invention comprises an armature which comprises plunger 18, and a stator which comprises a wire coil 22 that is wound around bobbin 24, a plunger stop 26 and plunger stop restraint 28, housing 12, and pole piece 42. It will be appreciated that the housing 12, plunger stop restraint 28, plunger stop 26, plunger 18, and pole piece 42 are all formed of magnetically permeable material.

Plunger 18 is substantially symmetrical about its central axis and comprises an axially extending solid rod section 72 of substantially the same radial diameter as plunger stop 26 which is also shaped as a solid cylindrical rod. Plunger rod section 72 and plunger stop 26 are aligned serially along and are coaxial with the axis of valve 10. The outlet end of plunger 18 comprises a section of enlarged outside diameter forming plunger valve head 20. Bobbin 24 comprises an axially elongated bobbin shaped member with a bore 34 axially extending therethrough having an inside diameter greater than the outside diameter of the plunger rod section 72 and plunger stop 26. Housing 12, coil 22, bobbin 24, plunger 18, and plunger stop 26 are all mutually co-axial and are arranged with the housing 12 as the radially outermost member of the valve 10 and with the plunger 18, and plunger stop 26 being the radially innermost members. Plunger rod section 72 is slidingly received within bobbin bore 34 and is restrained and guided by plunger guides 44 which closely receive the outside diameter of the plunger rod section 72. Plunger guides 44 are formed by axially extending ridges that protrude radially inward from the inside wall of bobbin bore 34 to slidingly receive and guide the plunger rod section 72 and to support and radially secure the outlet end of plunger stop 26. Plunger guides 44 are preferably equiangularly displaced about the axis of bobbin bore 34 and are at least three in number. In the illustrated preferred embodiment, plunger guides 44 are rounded; however other alternative configurations that provide similar support without binding the plunger 18 could be substituted. The inlet end of plunger stop 26 is secured by plunger restraint 28 which centrally receives the inlet end of plunger stop 26. The plane of plunger restraint 28 is normal to the axis of the valve 10 and the perimeter of plunger restraint 28 snugly engages the inside wall of housing 12, proximate to the inlet end of valve 10. An inlet opening 92 traverses plunger restraint 28 to provide fluid communication from the inlet port 16 to the interior of valve 10. Plunger restraint 28 is also traversed by openings 46 through which electrical leads 94 extend for the connection of the coil 22 to an electrical current control device (not shown) that regulates the flow of current through the coil and thereby regulates the operation of valve 10. End plug 30 is formed of an epoxy or other cement substance that is added in the assembly process to further secure the inlet end of plunger stop 26 and generally seal and secure the inlet end of valve 10.

Bobbin 24, being of bobbin shape, further comprises outlet end flange 48 and inlet end flange 50 which serve to contain the coil 22 against axial movement, and by extending to and engaging the inside wall of housing 12, flanges 48 and 50 radially secure and locate bobbin 24 within housing 12. The inlet end facing surface of bobbin inlet flange 50 additionally comprises a recessed portion 52 that in part define an inlet chamber 54 with which inlet port 16 communicates and into which the fluid media flows. An inlet end gasket 98 is located axially intermediate between inlet end flange 50 and plunger restraint 28, and is formed of a suitable material to seal inlet chamber 54 against leakage, particularly leakage of he fluid media into the coil 22. Upon assembly of valve 10, opening 92 is aligned with inlet chamber 54. Inlet chamber 54 is in direct fluid communication with the bobbin bore 34 through which an axially extending generally cylindrical flow passage is provided comprising the radial clearance between the inside wall of the bobbin bore 34 and the radially outer surfaces of plunger rod section 72 and plunger stop 26. The flow passage within bobbin bore 34 is generally annular except for the plunger guides 44. Bobbin inlet flange 50 also receives leads 94 such that coil wire 96 can be securely joined with leads 94. Bobbin outlet flange 48 is adapted to provide seal recess 56 as part of its radially outer surface to receive annular seal 58 which snugly and sealingly engages both outlet end flange 48 and the inside wall of housing 12. Proximate to the outlet end of bobbin 24, bobbin bore 34 comprises a section of increased internal diameter 60. The inlet end of bore section 60 provides a shoulder 62 upon which the inlet end of spring 32 is seated. The juncture of plunger valve head 20 with plunger rod section 72 forms plunger shoulder 64 which opposes bobbin shoulder 62 and seats the outlet end of spring 32. Spring 32 is preloaded to bias plunger 18 into sealing engagement with valve seat 38 such that valve 10 is normally closed. Plunger head 20 is a disk shaped member of greater radial outside diameter than valve seat 38, but lesser than the inside diameter of housing 12. The outlet side of plunger valve head 20 comprises a plunger face insert 40 that is an elastomeric disc, positioned to sealingly engage the valve seat 38. Proximate to the inlet side of plunger head 20, the housing 12 is slightly crimped forming housing section 88 of slightly lesser radial diameter on the outlet side of crimp than housing 12 generally and the interior surface of housing 12 forms an annular inlet end facing constriction 74. Constriction 74 restrains the axial movement of a pole piece 42, comprising a washer shaped member with a central opening 76. Pole piece 42 has an outside diameter approximately equal to the inside diameter of housing 12 on the inlet side of constriction 74 and is thereby securely restrained from axial movement by constriction 74 on the outlet side and outlet end flange 48 on the inlet side. The central opening 76 of pole piece 42 is of sufficient diameter to surround spring 32 without interfering with the operation of spring 32, but is not so great as the outside diameter of plunger valve head 20. The inlet side surface 78 of plunger head 20 and the outlet side surface 80 of pole piece 42 oppose each other and are generally parallel and engage when plunger 18 is retracted from valve seat 38. Central opening 76 is generally annular and slots 102 are formed in the outlet side surface 80 of pole piece 42 that extend radially outward from central opening 76 to perimeter of pole piece 42. Slots 102 must extend at least farther than the radially outer most edge of plunger head 20 to allow flow from section 60 to pass around plunger head 20 when the valve 10 is open and plunger head 20 is retracted and engages pole piece 42. In the illustrated preferred embodiment, two slots are provided and for manufacturing convenience, the slots 102 are aligned and extend to the edge of pole piece 42, but it should be anticipated that other numbers of slots 102 could be used although at least two slots 102 would seem preferable and at least one such passage is necessary. It is also possible that other configuration of a means for providing this flow passage can be substituted e.g. foramen of any shape consistent with providing radial electromagnetic flux pathway.

Figure 5:
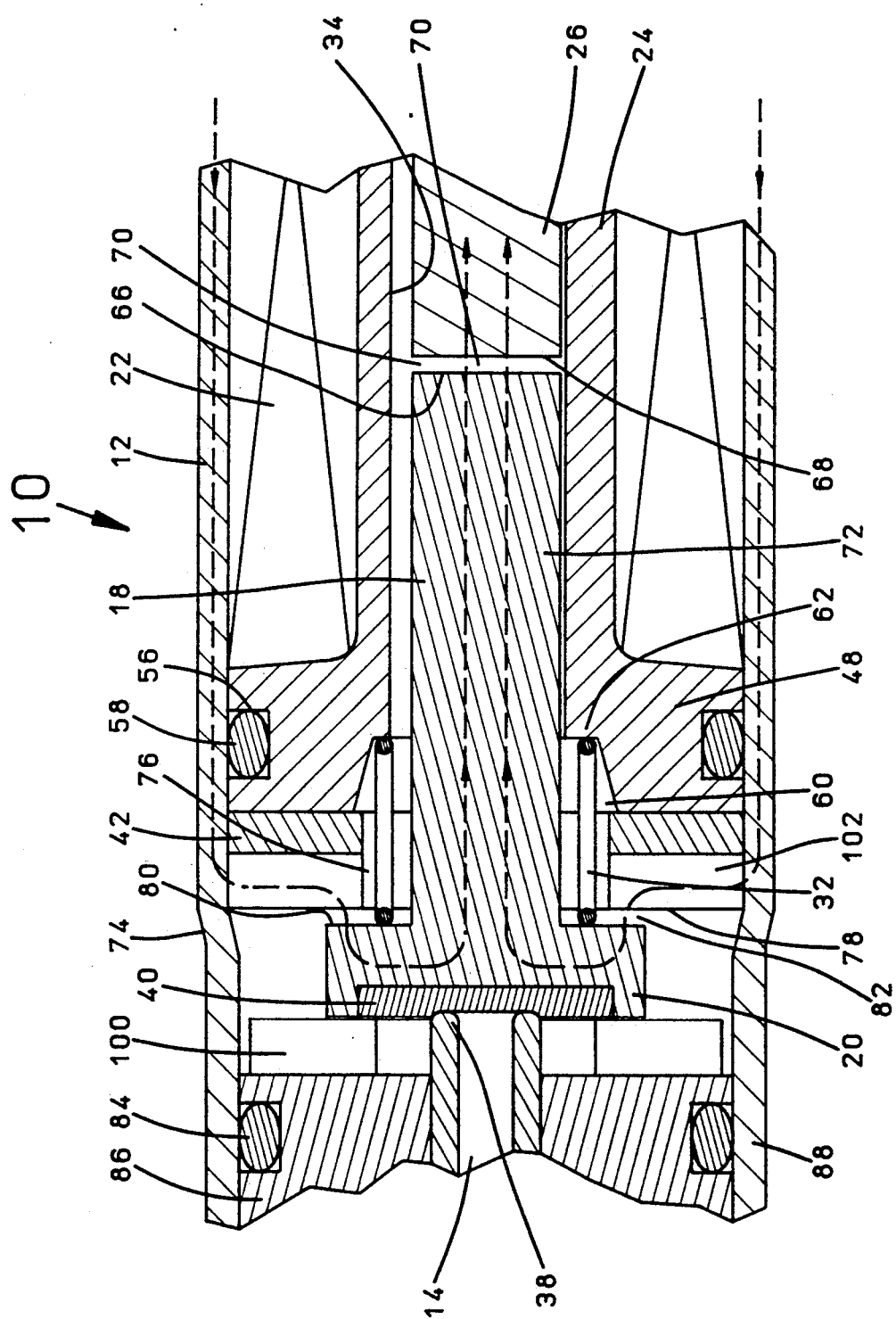
FIG. 5 is an enlarged, partial, longitudinal section view of an axial flow control valve incorporating a preferred embodiment of a solenoid valve actuator constructed in accordance with the present invention, showing the valve in an open, activated state, and showing lines of magnetic flux as broken lines with directional arrows.
Figure 6:
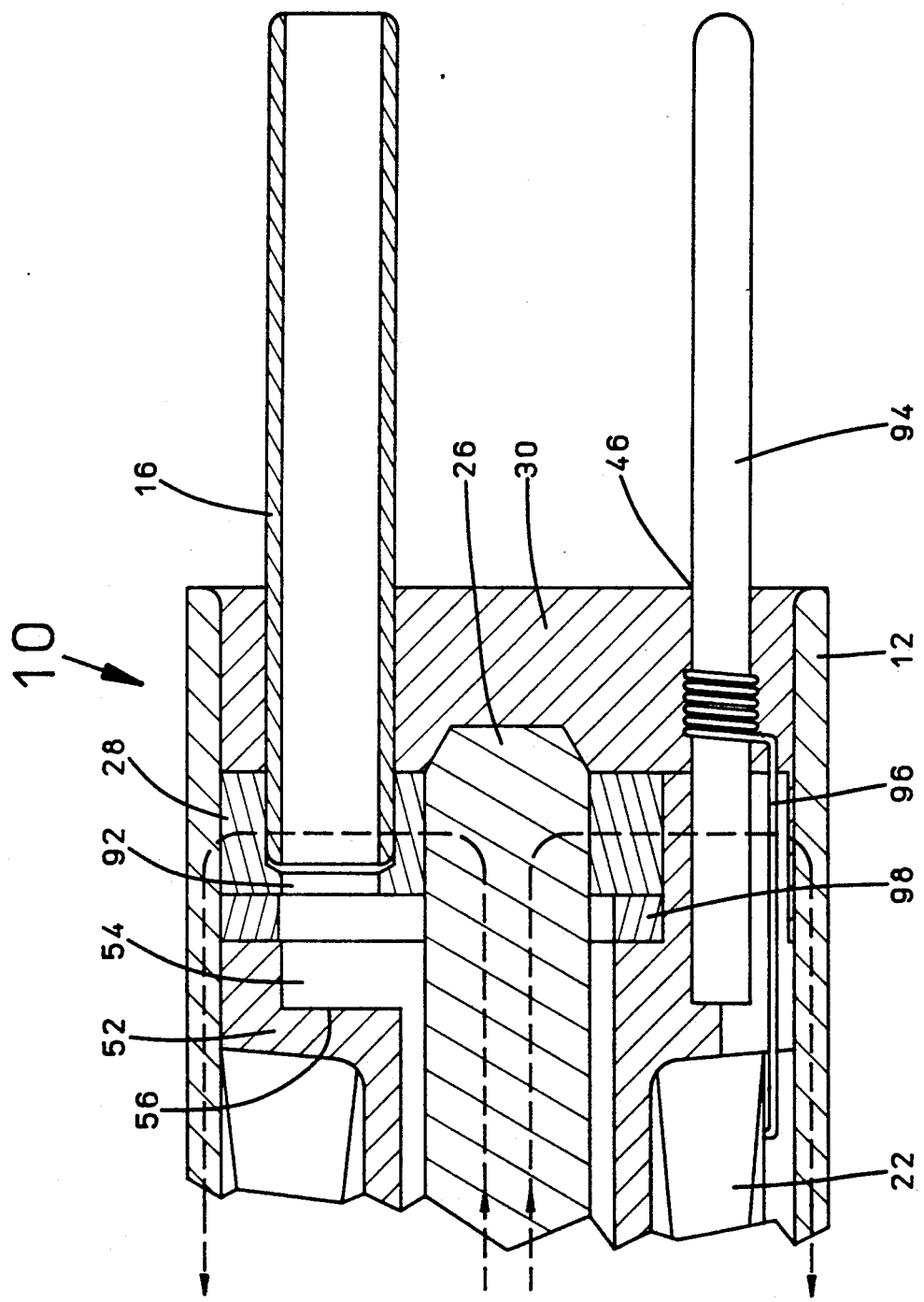
FIG. 6 is an enlarged, partial, longitudinal section view of an axial flow control valve incorporating a preferred embodiment of a solenoid valve actuator constructed in accordance with the present invention, showing the valve in an open, activated state, and showing lines of magnetic flux as broken lines with directional arrows.
Figure 7:
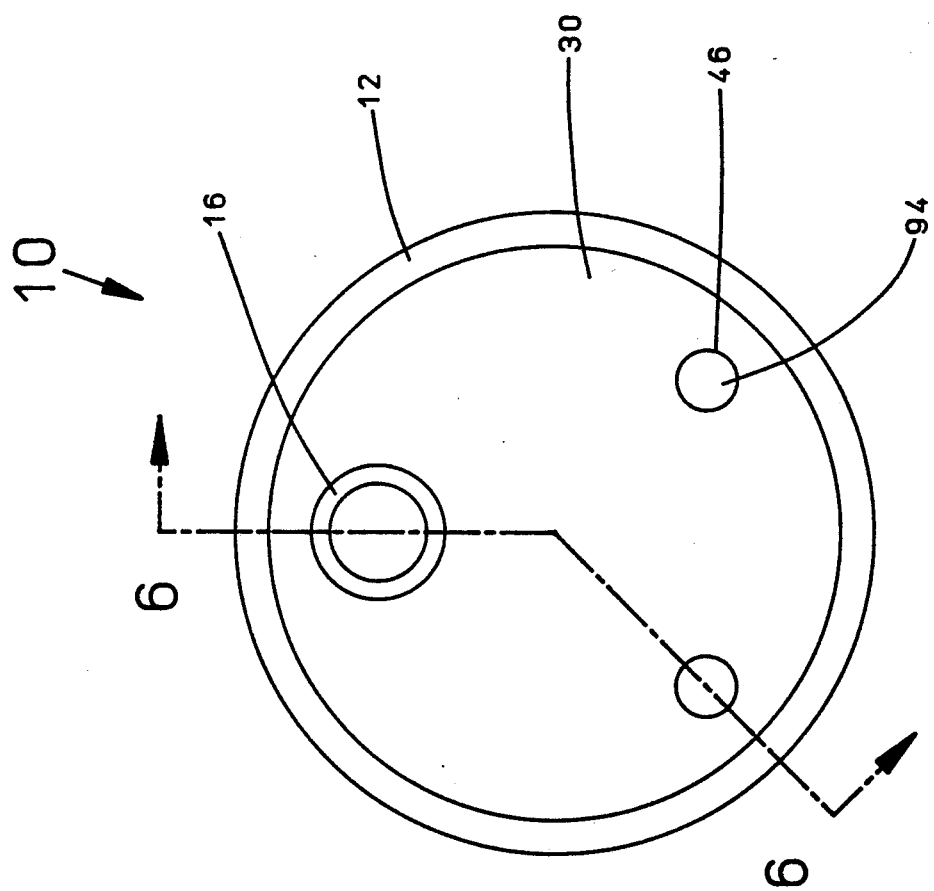
FIG. 7 is an enlarged, end view of the inlet end of an axial flow control valve incorporating a preferred embodiment of a solenoid valve actuator constructed in accordance with the present invention.

The generally planar inlet end of plunger rod section 72 forms a first pole surface 66 that is preferably flat and lying in a plane normal to the axis of the plunger 18. A second pole surface 68 is formed by the outlet end of plunger stop 26 which comprises a similarly planar surface normal to the axis of the plunger stop 26, parallel to and opposing the first pole surface 66. The separation of the first pole surface 66 and second pole surface 68 comprise the first working air gap 70. The radial overlap of a portion of the outlet side surface 78 of pole piece 42 and the inlet side surface 80 of plunger head 20 comprises a second working air gap 82 which is generally annular and coaxial with the plunger 18. Accordingly upon excitation of coil 22 a magnetic flux path as diagramed in FIGS. 5 and 6 completes a magnetic circuit across the first and the second air gaps 70 and 82 Both air gaps 70 and 82, when open, i.e. when valve 10 is closed, maintain the same separation which is as narrow as is consistent with providing sufficient retraction of plunger valva head 20 from valve seat 38 to allow the desired flow through the valve 10 when open.

An outlet end member 86 snugly engages the inside surface of housing section 88 and is formed of a generally cylindrical plug with a central passage therethrough for outlet port 14 to communicate with valve seat 38. Outlet end member 86 is secured in place within housing section 88 by a plug 90 formed of epoxy or other cement material that is added after toe end member 86 is positioned within valve 10. An annular inlet seal 84 is retained between the outer surface of member 86 and the inside of housing section 88 to seal the outlet end of valve 10 against leakage. A valve chamber 36 is formed by the inlet side of outlet member 86, the inside surface of housing section 88 and the outlet surface 78 of pole piece 42. The inlet side of outlet member 86 comprises a collar 100 that comprises When coil 22 is activated, plunger head 20 is axially displaced toward the inlet port such that plunger head 20 disengages from valve seat 38 allowing the fluid media to exit the valve chamber 36. The flow path of valve 10 therefore consists of the inlet port 16 communicating with the inlet chamber 54 which in turn communicates with the annular flow passage comprised of the gap between the outside diameter of the plunger stop 26 and the inside diameter of bobbin bore 34 thence continuing between plunger guides 44, thence through slots 102 of pole piece 42 which thereby allow communication with valve chamber 36 from which the fluid media passes through the annular orifice created by the displacement of plunger head 20 from valve seat 38 into outlet port 14 and exits the valve as aforesaid.

It should be anticipated that valve 10 is of miniature dimensions, being about 0.250 inches in diameter and about 0.800 inches in length, as is suitable and desired for ink-jet printing applications. It will further be anticipated that variation of the air gap separation has a direct, but opposite affect on both the flow capacity and the axial force upon plunger 18 and, therefore; the speed of valve operation. Since the effect of the air gap separation on the axial force is a function of the distance squared, while the effect on the flow capacity is not, manipulation of the valve seat configuration would be the preferable means of adjusting flow capacity. In the illustrated preferred embodiment, valve 10, being designed to deliver relatively minute discrete amounts of fluid, does not require a large flow capacity and thus the distance of retraction of plunger 18 from valve seat 38 and the separation of air gaps 70 and 82 is about 0.0040 inches, while the nominal diameter of valve seat 38 is about 0.032 inches. For the proper function of the actuator apparatus of valve 10, the electromagnetic flux created upon excitation of coil 22 must take the path illustrated in FIG. 5 rather than from the inside edge of pole piece 42 directly to plunger rod section 72. For this reason the clearance between opening 76 and plunger rod section 72 should be substantially greater than the separation of the opposing surfaces 78 and 80 (second air gap 82).

It should be appreciated and anticipated that a variety of materials could be used in the fabrication of the various components, provided housing 12, plunger stop restraint 28, plunger stop 26, plunger 18, and pole piece 42 are all formed of suitably magnetically permeable material while bobbin 24 and spring 32 are formed of non magnetic material.

It should be anticipated that the actuator apparatus of valve 10 may be useful in other type valves or devices and the valving elements of valve 10 may be altered or substituted in numerous configurations while still obtaining the benefits of the relatively high speed of operation. Nevertheless it should be noted that the valving configuration of valve 10 once closed would tend to remain closed and immediately after deactivation of coil 22 while still flowing, would tend to close due to the force of the fluid media. As a result closure spring 38 does not have to be as stiff as might be required in other valves and the speed of opening is thereby not diminished. Since the current application of valve 10 is in ink-jet printing, the total cycle speed is of primary importance and speed of closing is equally as important as speed of opening. Accordingly, a closure spring 38 is an aid to achieving a fast operating cycle but could be decreased or eliminated if speed is important only or mainly for the opening response, and if fast and tight closure is not particularly required.

In addition, it should be anticipated that the dimensions of coil 22 and bobbin 24 could be modified to some extent although the proportions and shapes of the elements of valve 10 as illustrated are believed to be optimum. The relatively long and thin configuration of plunger rod section 72, bobbin 24 and coil 22 provide for the effective suspension of plunger 18 by plunger guides 44 to avoid wobble and increase the electrical efficiency of coil 22 as well as providing a minimal overall radial dimension. When utilized as designed, in a multi-valve bank, with little or no separation of valves the minimal radial dimension is desired. In applications wherein these factors are not as important, the proportion of the elements of valve 10 could be modified without eliminating the benefits of the axial alignment of both air gaps.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. An electromagnetic actuator comprising
   A. armature means comprising a first rod shaped section and a second section of increased radius,
   B. stator means comprising a generally cylindrical housing having a first pole piece and a second pole piece, the stator means defining a flow path axially extending through the stator means, and
   C. coil means contained within the stator means, wherein the stator means and the armature means defined a closed electromagnetic circuit upon excitation of the coil means, the circuit comprising a first air gap between the rod section of the armature and the first pole piece and a second air gap between the increased radius armature section and the second pole piece, the plane of both air gaps being normal to the axis of the armature.

2. The actuator of claim 1 wherein the second pole piece comprises a washer shaped member having a central opening of a diameter larger than that of the armature rod section and less than that of the armature section of increased radius.

3. The actuator of claim 2 wherein the first pole piece comprises an axially extending rod shaped section.

4. The actuator of claim 3 wherein the coil means further comprises a bobbin means for containing and supporting the coil means wherein the bobbin means is formed of a relatively non electromagnetically permeable material and defines a central bore, and wherein the armature means and the stator means are formed of relatively electromagnetically permeable materials.

5. The actuator of claim 4 wherein the armature rod section is slidingly disposed within the bobbin bore and the first pole piece axially extends into the bobbin bore.

6. The actuator of claim 5 wherein the bobbin bore is of greater diameter than both the armature rod section and the axially extending portion of the first pole piece and wherein the bobbin bore further comprises means for guiding the armature rod section and securing the axially extending portion of the first pole piece in a central position coaxial with the bobbin bore.

7. The actuator of claim 6 wherein the armature means is adapted to operate a fluid control valve.

8. The actuator of claim 7 wherein the armature section of increased radius further comprises valve head means for releasably engaging a valve seat.

9. The actuator of claim 8 wherein the washer shaped member of the second pole piece forms at least one orifice located farther from the axis of the armature than the radially outer edge of the armature section of increased radius and the flow passage is defined through the annular clearance between the inside wall of the bobbin bore and the axially extending section of the first pole piece and the armature rod section.

10. The actuator of claim 9 further comprising means for axially biasing the armature means away from the first and second pole pieces, the biasing means providing less axial force than the opposing electromagnetic force across both air gaps upon excitation of the coil means.

11. A valve device comprising
    A. valve seat means,
    B. valve head means for engaging the valve seat means and thereby preventing flow through the valve, the valve head means being actuated by electromagnetic actuator means for causing the valve head means to releasably engage the valve seat, comprising an armature comprising a first rod shaped section and a second valve head section of increased radius, and a stator comprising a generally cylindrical housing having a first pole piece and a second pole piece and a wire coil contained within the housing, wherein an axially extending flow path is defined through the stator means wherein the stator and the armature define a closed electromagnetic circuit upon sufficient electrical current passing through the wire coil, the circuit comprising a first air gap between the rod section of the armature and the first pole piece and a second air gap between the valve head section and the second pole piece, the plane of both air gaps being normal to the axis of the armature.

12. The valve device of claim 11 wherein the second pole piece comprises a washer shaped member having a central opening of a diameter larger than that of the armature rod section and less than that of the armature valve head section, and further forming at least one opening means for allowing flow past the armature valve head section to the valve seat.

13. The valve device of claim 12 wherein the first pole piece comprises an axially extending rod shaped section.

14. The valve device of claim 13 wherein the coil means further comprises a bobbin means for containing and supporting the coil means wherein the bobbin means is formed of a relatively non magnetic material and defines a central bore, and wherein the armature means and the stator means are formed of relatively electromagnetically permeable materials.

15. The valve device of claim 14 wherein the armature rod section is slidingly disposed within the bobbin bore and the first pole piece axially extends into the bobbin bore.

16. The valve device of claim 15 wherein the bobbin bore is of greater diameter than both the armature rod section and the axially extending portion of the first pole piece and wherein the bobbin bore further comprises means for guiding the armature rod section and for securing the axially extending portion of the first pole piece in a central position coaxial with the bobbin bore.

17. The valve device of claim 16 wherein the opening means comprise a plurality of grooves in the surface of the second pole piece that radially extend past the outer edge of the armature valve head section.

18. The valve device of claim 17 wherein the armature valve head further comprises valve head means for sealingly engaging the valve seat.

19. The valve device of claim 18 wherein a flow passage is defined through the annular clearance between the inside wall of the bobbin bore and the outside surfaces of the axially extending section of the first pole piece and the armature rod section.

20. The valve device of claim 19 further comprising means for axially biasing the armature means away from the first and second pole pieces, the biasing means providing less axial force than the opposing electromagnetic force across both air gaps upon excitation of the coil means.

* * * * *